Nov. 23, 1943.  J. E. O. FELLER  2,335,179
FILM REEL
Original Filed Dec. 20, 1939

Inventor
John E. O. Feller
By Frease and Bishop
Attorneys

Patented Nov. 23, 1943

2,335,179

UNITED STATES PATENT OFFICE 2,335,179

FILM REEL

John E. O. Feller, Canton, Ohio

Original application December 20, 1939, Serial No. 310,195, now Patent No. 2,269,653, dated January 13, 1942. Divided and this application July 22, 1941, Serial No. 403,489

3 Claims. (Cl. 242—72)

The invention relates to a reel for receiving and supporting the film for a motion picture projector and the present application is a division of my copending application for film winding apparatus, Serial No. 310,195, filed December 20, 1939, now Patent No. 2,269,653, issued January 13, 1942.

The invention has for its object the provision of a film reel adapted to be installed upon a motion picture projector of usual and well-known construction to take the place of the usual receiving spool or reel, the improved reel including means whereby the film may be rewound therein from the periphery toward the center whereby the film is in proper position to permit said reel to be transferred to the usual feed shaft provided upon projectors so that film may be fed therefrom and passed through the projector, whereby the improved film reel is used alternately as a feed reel and as a receiving drum or spool.

A further object is the provision of a film reel of this character comprising a side plate with a hub fixed thereto and arranged to be journaled upon the feed reel shaft or the receiving drum shaft of the projector as required, a removable peripheral ring for attachment to the periphery of said side plate, a removable side plate for detachable connection to the other end of the hub, a split ring located between the side plates and means for contracting or expanding the split ring within the coil of film.

Figure 2:
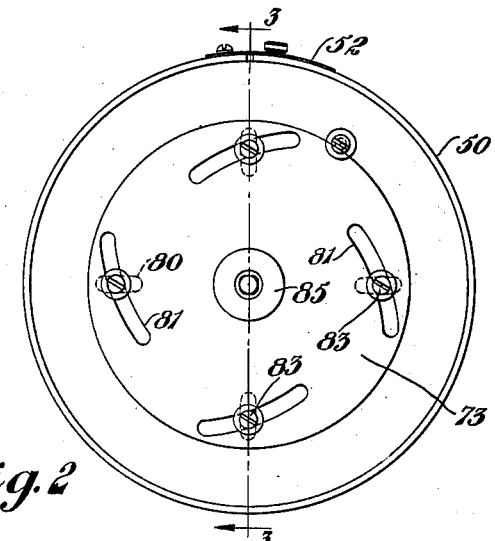
Figure 3:
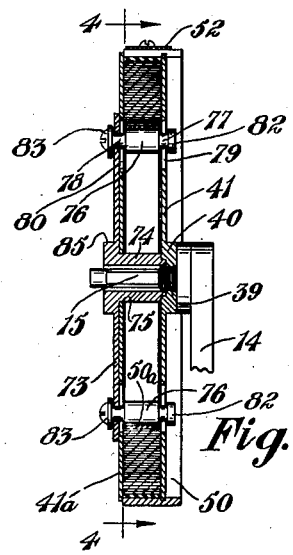
Figure 4:
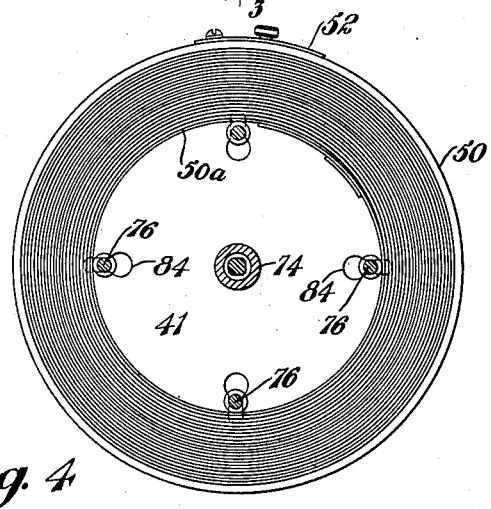
Figure 5:
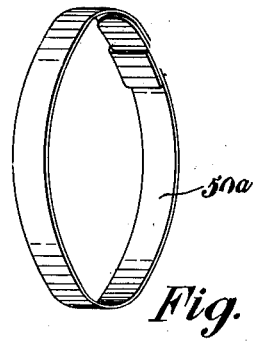
Figure 1:
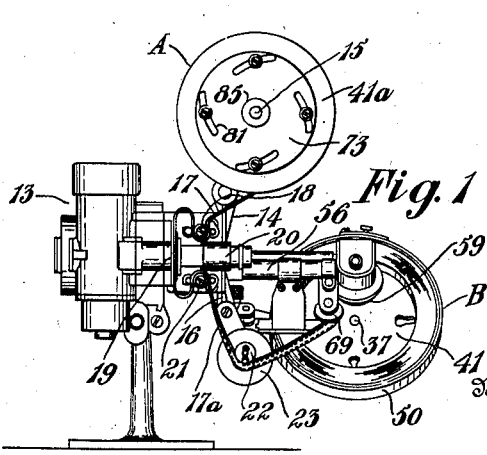

The above objects together with others which will be apparent from the drawing and following description may be attained by constructing the improved film winding apparatus in the manner illustrated in the accompanying drawing in which Figure 1 is a side elevation of a motion picture projector of usual and well-known design showing the improved film reel in use therein as a feed reel and also as a receiving drum;

Fig. 2, a side elevation of the improved film reel;

Fig. 3, a transverse sectional view of the reel taken as on the line 3—3, Fig. 2;

Fig. 4, a section taken as on the line 4—4, Fig. 3;

Fig. 5, a detached perspective view of the split expansible ring; and

Figure 6:
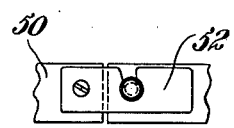

Fig. 6, a detail elevation of the locking means for the split ring which surrounds the reel when used for receiving a film from the projector.

Similar numerals refer to similar parts throughout the several views.

A motion picture projector of conventional design is indicated generally at 13 and is provided with the usual upwardly disposed supporting bracket 14 which supports the usual feed shaft 15 upon which the feed reel or spool is ordinarily journaled, and with the usual downwardly disposed supporting bracket 16 upon which the receiving reel is ordinarily carried.

The improved film reel to which the invention pertains is adapted to be used alternately as a feed reel or spool and a receiving reel or drum and is indicated at A in Figure 1 as mounted upon the feed reel shaft 15 and at B in the same figure functioning as the receiving reel or drum.

The film indicated at 17 is withdrawn from the feed reel or spool A and passes under the roller 18 then down through the guide 19 located behind the usual projector lens 20 and then over the pulley 21 passing downward therefrom as indicated at 17a where in general practice it is wound upon the receiving reel or spool from which it must be latter rewound so as to be in proper position to be again passed through the projector.

As disclosed in detail in the parent application, of which this is a division, the film then passes under the conical pulley 22 provided with a tapered rim flange 23 and then to the improved film reel as indicated at B which acts as a receiving reel or drum.

The mechanism by which the film is wound within the receiving drum is disclosed and claimed in the parent application and since the present application is directed to the film reel per se it is not thought necessary to further disclose or describe such mechnaism in this application.

The improved film reel to which the invention pertains includes the side plate or disk 41 having a hub portion 40 provided with a threaded bore 39 adapted to be mounted upon the threaded portion of the feed reel shaft 15 or of the receiving reel shaft 37 as desired.

The split peripheral flange ring 50 is provided for clamping around the periphery of the disk or side plate 41 of the improved reel when the same is to be used as a receiving reel or drum, thus, forming an open sided drum as shown at B in Figure 1.

As set forth in the parent application above referred to, this receiving drum is mounted upon the shaft 37 carried by a floating arm illustrated and described in detail in said parent case but not shown in this application since it forms no part of the film reel itself to which the present claims are directed.

The ring 50 of the receiving reel is thus supported by gravity upon the driving roller 59 carried by the arm 56 which is rigidly connected to the front portion of the projector and driven by gearing as disclosed in said parent application to rotate the receiving reel B.

As the projector is operated the film 17 is withdrawn from the feed reel A in usual manner and passed between the lens and the light in the projector and then downwardly as indicated at 17a around the pulley 22 and idler pulley 69 and then over the driving roller 59, the film being passed between the inner surface of the peripheral ring 50 and the roller 59.

As the roller 59 is driven, the receiving reel B is thus driven thereby coiling the film within the reel with the leading end to the outside, the film being coiled from the periphery to the center of the reel and thus being transferred into the receiving reel in the same position it occupied upon the feed reel so that it is not necessary to rewind the film before again exhibiting it in the projector.

When all of the film has been coiled within the receiving reel the swinging arm (not shown) may be operated to move the receiving reel B away from the driving roller 59.

A split expanding ring 50a is then inserted within the open center of the coil of film and the reel is removed from the shaft 37 and placed upon the feed shaft 15.

The removable side plate or disk 41a may then be placed in position upon the reel as shown in Figs. 2 and 3. This removable side plate has a smaller disk 73 journaled thereon as by the hub 74 rotatably mounted within the central opening 75 of the removable side plate 41a.

A plurality of spacing pins 76 may be carried by the removable side plate 41a and its disk 73, these spacing pins having reduced end portions 77 and 78 received through the corresponding radial slots 79 and 80 respectively, in the side plates 41 and 41a, the reduced end portions 78 of these pins being also received through the curved slots 81 in the disk 73.

A head 82 may be formed upon one end of each of the spacing pins 76 and a flange headed screw 83 may be engaged in the other reduced end of each spacing pin to retain them in position.

It should be understood that the spacing pins 76 are normally located at the inner ends of the slots 80 so that when the removable side plate 41a is placed in position upon the reel the heads 82 of the spacing pins will be received in the enlarged inner ends 84 of the radial slots 79 in the side plate 41.

The disk 73 may then be rotated relative to the removable side plate 41a, by means of the knob 85 to the position shown in Figs. 2, 3, and 4, moving the spacing pins 76 radially outward through the slots 79 and 80 and expanding the split ring 50a within the coil of film.

The latch plate 52 may then be opened and the peripheral flange ring 50 removed from the reel which is then in the condition and position shown at A in Figure 1, ready to function as a feed reel from which the film may be withdrawn as indicated at 17 in Figure 1 and passed downward between the lens and lamp of the projector as indicated at 19, thence downward as indicated at 17a and around the pulleys 22 and 69 and recoiled in the receiving reel as above described.

It should be understood that for this purpose a receiving reel is formed by placing a split flange ring 50 upon a side plate 41, in the manner above described and mounting the same upon the shaft 37, in the position shown at B in Figure 1.

I claim:

1. A film reversing feed reel and receiving drum for a motion picture projector having a feed reel shaft and a receiving drum shaft, comprising a side plate having a hub portion arranged to be alternately mounted upon the receiving drum shaft and upon the feed reel shaft, a removable peripheral ring, placed around the periphery of the side plate, a second side plate connected to the open side of the drum, a hub journalled upon the second side plate said second hub being arranged to be placed upon the feed reel shaft, a disc fixedly mounted upon said second hub adjacent to the second side plate, there being a plurality of radial slots in each side plate, the disc having a plurality of curved slots therein, transverse pins located through the corresponding slots of the side plates and disc, a split ring located around the spacing pins and within the coil of film, and means for rotating the disc relative to the side plates to move the spacing pins toward or from the center of the drum to contract or expand the split ring within the coil of film.

2. A film reversing feed reel and receiving drum for a motion picture projector having a feed reel shaft and a receiving drum shaft, comprising a side plate having a hub portion arranged to be alternately mounted upon the receiving drum shaft and upon the feed reel shaft, a removable peripheral ring placed around the periphery of the side plate, a second side plate connected to the open side of the drum, a hub journalled upon the second side plate said second hub being arranged to be placed upon the feed reel shaft, a disc fixedly mounted upon said second hub adjacent to the second side plate, there being a plurality of radial slots in each side plate, the disc having a plurality of curved slots therein, transverse pins located through the corresponding slots of the side plates and disc, the slots in the first named side plate being enlarged at their inner ends, heads upon the free ends of the spacing pins adapted to be received through said enlarged inner ends of the slots, a split ring located around the spacing pins and within the coil of film, and means for rotating the disc relative to the side plates to move the spacing pins toward or from the center of the drum to contract or expand the split ring within the coil of film.

3. A film reversing feed reel and receiving drum for a motion picture projector having a feed reel shaft and a receiving drum shaft, comprising a side plate having a hub portion provided with internal screw threads for alternate mounting upon the receiving drum shaft and upon the feed reel shaft, a removable peripheral split ring placed around the periphery of the side plate, means for clamping said peripheral ring around the side plate, a second side plate connected to the open side of the drum, a second hub journalled upon the second side plate, said second hub being arranged to be placed upon the feed reel shaft and to abut the first hub, a disc fixedly mounted upon said second hub adjacent to the outer side of the second side plate, there being a plurality of radial slots in each side plate, the disc having a plurality of curved slots therein, transverse pins located through the corresponding slots of the side plates and disc, the slots in the first named side plate being enlarged at their inner ends, heads upon the free ends of the spacing pins adapted to be received through said enlarged inner ends of the slots, a split ring located around the spacing pins and within the coil of film, and means for rotating the disc relative to the side plates to move the spacing pins toward or from the center of the drum to contract or expand the split ring within the coil of film.

JOHN E. O. FELLER.